US011251670B2

(12) United States Patent
Tokoi et al.

(10) Patent No.: US 11,251,670 B2
(45) Date of Patent: Feb. 15, 2022

(54) AXIAL AIR-GAP ROTARY ELECTRIC MACHINE HAVING A DIFFERENT NUMBER OF INTERNAL SIDE LAYERS AND EXTERNAL SIDE LAYERS

(71) Applicant: Hitachi Industrial Equipment Systems Co., Ltd., Tokyo (JP)

(72) Inventors: Hirooki Tokoi, Tokyo (JP); Daisuke Kitajima, Tokyo (JP); Tomonori Kawagoe, Tokyo (JP); Katsuyuki Yamazaki, Tokyo (JP); Toru Sakai, Tokyo (JP); Shuuichi Takahashi, Tokyo (JP); Toshifumi Suzuki, Tokyo (JP); Norihisa Iwasaki, Tokyo (JP); Ryousou Masaki, Tokyo (JP); Yuji Enomoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 564 days.

(21) Appl. No.: 15/305,706

(22) PCT Filed: Apr. 23, 2014

(86) PCT No.: PCT/JP2014/061350
§ 371 (c)(1),
(2) Date: Jan. 11, 2017

(87) PCT Pub. No.: WO2015/162708
PCT Pub. Date: Oct. 29, 2015

(65) Prior Publication Data
US 2017/0163112 A1 Jun. 8, 2017

(51) Int. Cl.
*H02K 3/18* (2006.01)
*H02K 3/46* (2006.01)
(Continued)

(52) U.S. Cl.
CPC .............. *H02K 3/18* (2013.01); *H02K 3/325* (2013.01); *H02K 3/46* (2013.01); *H02K 21/24* (2013.01); *H02K 1/2793* (2013.01)

(58) Field of Classification Search
CPC ........ H02K 1/2793; H02K 21/24; H02K 3/18; H02K 3/325; H02K 3/46; H02K 15/12;
(Continued)

(56) References Cited

U.S. PATENT DOCUMENTS

| 6,127,760 A * | 10/2000 | Nagasaki | H02K 1/146 310/216.074 |
| 2006/0113856 A1* | 6/2006 | Tanno | H02K 21/24 310/156.37 |

(Continued)

FOREIGN PATENT DOCUMENTS

| CN | 1874114 A | 12/2006 |
| JP | 2006-129623 A | 5/2006 |

(Continued)

OTHER PUBLICATIONS

Yoshinari et al., Daikin Ind. Ltd., English Translated version of JP patent JP 2009-148084A (Year: 2009).*

(Continued)

*Primary Examiner* — Emily P Pham
(74) *Attorney, Agent, or Firm* — Crowell & Moring LLP (57) ABSTRACT

An axial air-gap rotary electric machine includes a stator, a coil, and a bobbin. The bobbin includes a tube and a flange. The coil is wound on the outer periphery of the tube portion with regular winding. A number of turns of each of a plurality of layers wound around an external side of a last layer in contact with the flange is at least one less than a number of turns of each of a plurality of layers wound around an adjacent internal side of the last layer.

13 Claims, 9 Drawing Sheets

(51) Int. Cl.
*H02K 21/24* (2006.01)
*H02K 3/32* (2006.01)
*H02K 1/27* (2006.01)

(58) Field of Classification Search
CPC ...... H02K 1/17; H02K 1/182; H02K 2203/06; H02K 3/28; H02K 3/30; H02K 3/32; H02K 3/47
See application file for complete search history.

(56) References Cited

U.S. PATENT DOCUMENTS

| | | | |
|---|---|---|---|
| 2006/0279146 A1 | 12/2006 | Ishigami et al. | |
| 2007/0001540 A1* | 1/2007 | Matsuzaki | H02K 3/524 310/268 |
| 2014/0009009 A1 | 1/2014 | Deguchi et al. | |
| 2015/0303745 A1* | 10/2015 | Matsumoto | H02K 1/182 310/43 |
| 2015/0364956 A1* | 12/2015 | Woolmer | H02K 3/24 310/54 |

FOREIGN PATENT DOCUMENTS

| | | |
|---|---|---|
| JP | 2007-135397 A | 5/2007 |
| JP | 2009-44941 A | 2/2009 |
| JP | 2009-148084 A | 7/2009 |
| JP | 2009-278839 A | 11/2009 |
| JP | 2010-172195 A | 8/2010 |
| JP | 2011-115008 A | 6/2011 |
| JP | 2014-17915 A | 1/2014 |

OTHER PUBLICATIONS

Chinese-language Office Action issued in counterpart Chinese Application No. 201480080088.0 dated May 14, 2018 (six (6) pages).
International Search Report (PCT/ISA/210) issued in PCT Application No. PCT/JP2014/061350 dated Jul. 29, 2014 with English-language translation (three (3) pages).
Extended European Search Report issued in counterpart European Application No. 14890397.4 dated Nov. 29, 2017 (Nine (9) pages).
Extended European Search Report issued in counterpart European Application No. 14 890 397.4 dated Feb. 14, 2019 (eight (8) pages).

* cited by examiner

AXIAL AIR-GAP ROTARY ELECTRIC MACHINE HAVING A DIFFERENT NUMBER OF INTERNAL SIDE LAYERS AND EXTERNAL SIDE LAYERS

TECHNICAL FIELD

The present invention relates to an axial air-gap rotary electric machine, and more particularly, relates to an axial air-gap rotary electric machine for winding a coil around a bobbin.

BACKGROUND ART

As rotary electric machines are desired to achieve a smaller size and a higher efficiency, axial air-gap rotary electric machines attract attention. This rotary electric machine has such a structure that a disk-shaped rotator and a cylindrical stator face each other in a rotation axis direction. Since a gap surface generating a torque increases substantially in proportional to a square of a diameter, this is useful for reducing the size and increasing the efficiency of rotary electric machines having thin shapes in particular.

A stator of an axial air-gap rotary electric machine includes multiple iron cores disposed along an inner periphery of a housing and a coil wound around an iron core via an insulating member. The insulating member is often made of a resin bobbin formed in accordance with a side surface shape of a winding wire and the iron core, because, e.g., the bobbin is reliable in insulation between the iron core and the coil and because of ease of assembly. The bobbin includes a tube portion which comes into contact with the iron core and around which the wire is wound and flange portions protruding in an outer periphery direction of the iron core from both ends of the tube portion. The core members including the iron core, the coil, and the bobbin are integrated by some kind of means. In a double rotor type axial air-gap rotary electric machine in which a stator is sandwiched by two rotators, mold resin may be used as holding means of the core members.

In this case, in order to reduce the size and increase the efficiency of rotary electric machines, it is important to arrange the iron core and the coils directly contributing to the torque output with a higher density within the stator. The iron core is an essential feature for forming a magnetic circuit of the rotary electric machine, and when it is formed to reduce the magnetic resistance of the main magnetic flux, the magnetic flux generated by the coil and the permanent magnet can be effectively used. Increasing the volume of the coil will lead to expansion of the wire diameter in a case where the same number of turns is assumed. This will lead to reduction of the joule loss generated in the coil. On the other hand, if you try to increase the density of the iron core and the coil, the gap dimension of each unit will be reduced, so that this may result in deterioration in the productivity and the increase in the cost. Therefore, it is necessary to improve the space factor of the iron core and the coil while the productivity and the low cost performance are maintained.

As a technique for improving the density of iron cores and armature winding wires in a rotary electric machine, Patent Literature 1 discloses a structure and a method for increasing the density of the coils of the armatures used for the rotary electric machine. Patent Literature 1 indicates that, after the coil is wound around the bobbin storing the iron core, the coil surface is pressurized in the iron core direction.

CITATION LIST

Patent Literature

PATENT LITERATURE 1: JP-A-2007-135397

SUMMARY OF INVENTION

Technical Problem

However, when the density of the iron core and the armature winding wire is increased in accordance with the technique disclosed in Patent Literature 1, there are the following problems.

(1) When the iron core and the coil are arranged with a higher density, the gap between coils of the adjacent core members and the gap between the coil and the housing inner periphery surface are reduced. In a case of a configuration for applying resin mold to a stator, a flow path of resin is reduced, and therefore, it is necessary to increase the filling pressure. As a result, this may result in deformation of the iron core and the coil, filling failure such as misalignment, and the like due to this reason.

(2) When the coil and the housing inner periphery are close to each other, it is necessary to arrange a connecting line of each core member on a rotator side surface. When the connecting line and the rotator are close to each other, the static electricity capacity therebetween increases. As a result, this will bring about an increase in an axial voltage and bearing electrolytic corrosion that occurs therefrom. On the other hand, it is necessary to have a holding mechanism for avoiding contact between the connecting line and the rotator.

(3) In order to increase the density of coil winding, it is necessary to increase the tension applied to the coil when the coil is wound and to increase the formation pressure after the coil is wound. In a case where a flange portion is provided on the bobbin end portion side, the force is applied from the coil to the bobbin flange portion in accordance with the tension applied to the coil. In a case where the pressure molding is performed after the coil is wound, a force according to the formation pressure is applied to the bobbin flange portion. As a result, a stress is concentrated on the attachment portion of the bobbin flange portion, and this may result in a damage and the like. In particular, in a case where the iron core is a core member in an open slot shape having the same cross section in the rotation axis direction, there is no member that can withstand the force applied from the coil to the flange portion, and therefore, the flange portion is likely to be deformed or damaged.

(4) When an iron core end surface in a rotation axis direction and a coil end surface are brought closer to each other in an open slot type core member, leakage magnetic flux is interlinked with the coil. In particular, in a case where the skin depth of the leakage magnetic flux with respect to the coil is sufficiently smaller than the coil diameter, the loss generated in the coil is high, and this may bring about a reduction in the efficiency of the rotary electric machine.

It is desired to achieve a configuration that satisfies the requirements such as characteristics of the output and the efficiency, reliability, a reduction in the size, a reduction in the cost, and the like.

Solution to Problem

To achieve the above object, for example, configurations described in the claims are applied. That is, the configurations include an axial air-gap rotary electric machine including a stator in which a plurality of core members including an iron core made of a substantially pillar body, a coil wound in an outer periphery of the iron core, and a bobbin disposed between the iron core and the coil are arranged in an annular shape along an inner periphery surface of a housing around a rotation axis, and an at least one rotator facing an end surface of the iron core with a predetermined air gap interposed in a rotation axis diameter direction, wherein the bobbin includes: a tube portion into which the iron core is inserted; and flange portions provided around at least one of both opening end portions of the tube portion and extending a predetermined length in a direction perpendicular to an outer periphery of the tube portion, and the coil is wound on the tube portion outer periphery with regular winding, and layers in which a number of turns for each layer in a layer wound at an external side with respect to a layer wound in contact with the flange portion is a number of turns obtained by subtracting at least one from a number of turns in a layer at an internal side adjacent thereto are continuously provided.

Advantageous Effects of Invention

According to an aspect of the present invention, in an axial air-gap rotary electric machine, a higher density in iron cores and coils can be realized without sacrificing characteristics of the output and the efficiency, reliability, a reduction in the size, a reduction in the cost, and the like.

The problems, configurations, and the effects other than those explained above of the present invention would be understood from the following explanation about the embodiments.

DESCRIPTION OF EMBODIMENTS

First Embodiment

Figure 1:
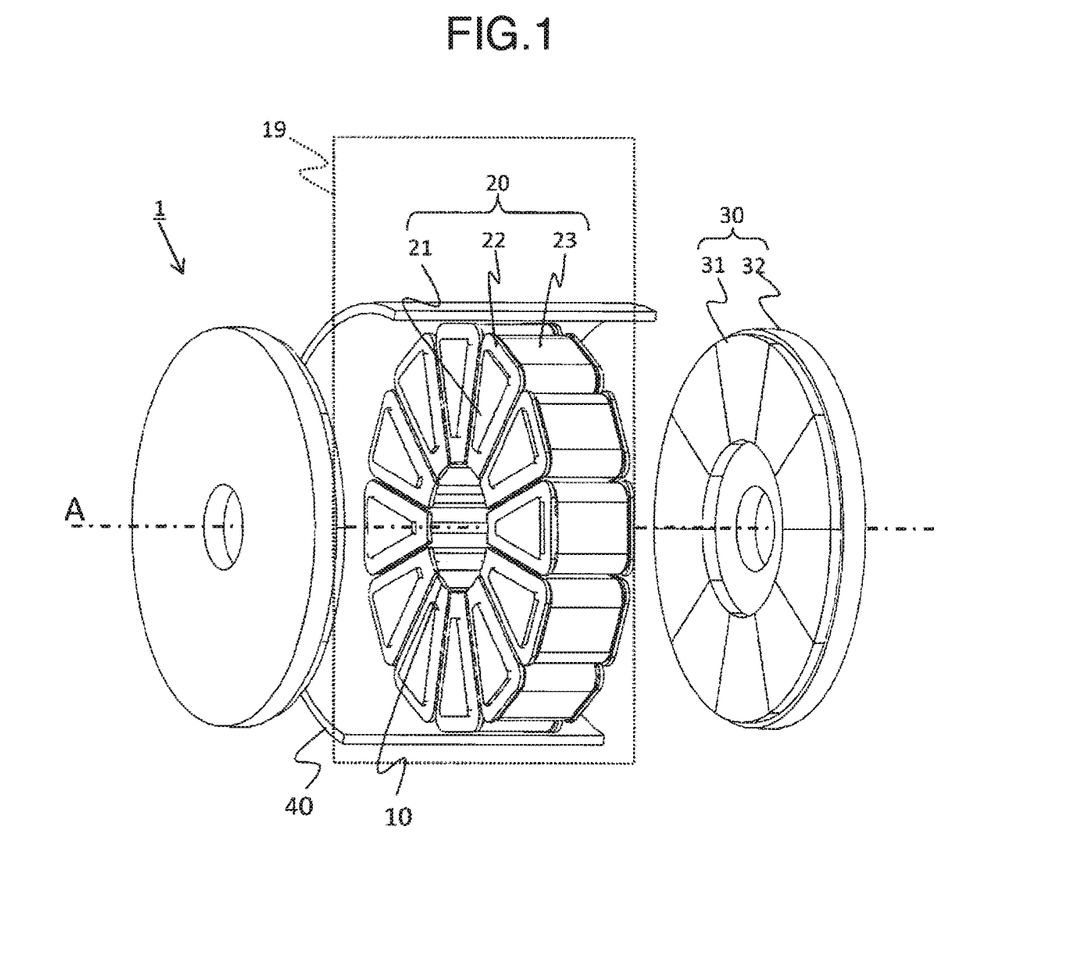
FIG. 1 is a perspective view illustrating a schematic configuration of an armature of an axial air-gap motor according to a first embodiment to which the present invention is applied.

Hereinafter, modes for carrying out the present invention will be explained with reference to drawings. FIG. 1 schematically illustrates an armature structure of a double rotor-type axial air-gap permanent magnet synchronous motor 1 (which may be hereinafter referred to as a "motor 1") according to the first embodiment to which the present invention is applied.

The motor 1 includes a donut-shaped stator 19 arranged along an inner periphery of a housing 40 and two disk-shaped rotators 30 disposed to sandwich the stator 19 in a rotation axis direction. An end surface of the stator 19 and a round flat surface of the rotator 30 face each other with a predetermined air gap interposed therebetween in a rotation axis diameter direction. A rotation shaft (not shown) connected to the center of the rotator 30 penetrates through the opening of the internal tube portion formed in the central portion of the stator 19, and the stator 19 is sandwiched, and the rotation shaft is connected to the rotator 30 provided at the opposite side. Both end portions of the rotation shaft are rotatably connected to brackets (not shown) at the output side and the anti-output side via bearings. Both end brackets are mechanically connected to around the both end portions of the housing 40 having a substantially tube-shape. A terminal box is provided on an outer periphery side surface of the housing 40. An electrical wire at a primary side and an electrical wire at a secondary side are electrically connected via the terminal block. A connecting line extending from each core member 20 is connected to the secondary side.

The rotator 30 includes permanent magnets 31 and a yoke 32 for supporting the permanent magnets 31. In the permanent magnet 31, substantially fan-shaped plate-like magnets having different magnetic poles are disposed alternately, and the permanent magnet 31 rotates by repeatedly attracting and repelling switching magnetic flux in the direction of the rotation axis A generated by the stator 19. In the present embodiment, a ferrite magnet is applied as the permanent magnet, but the present embodiment is not limited thereto. A back yoke may be provided between the permanent magnet 31 and the yoke 32.

Figure 2:
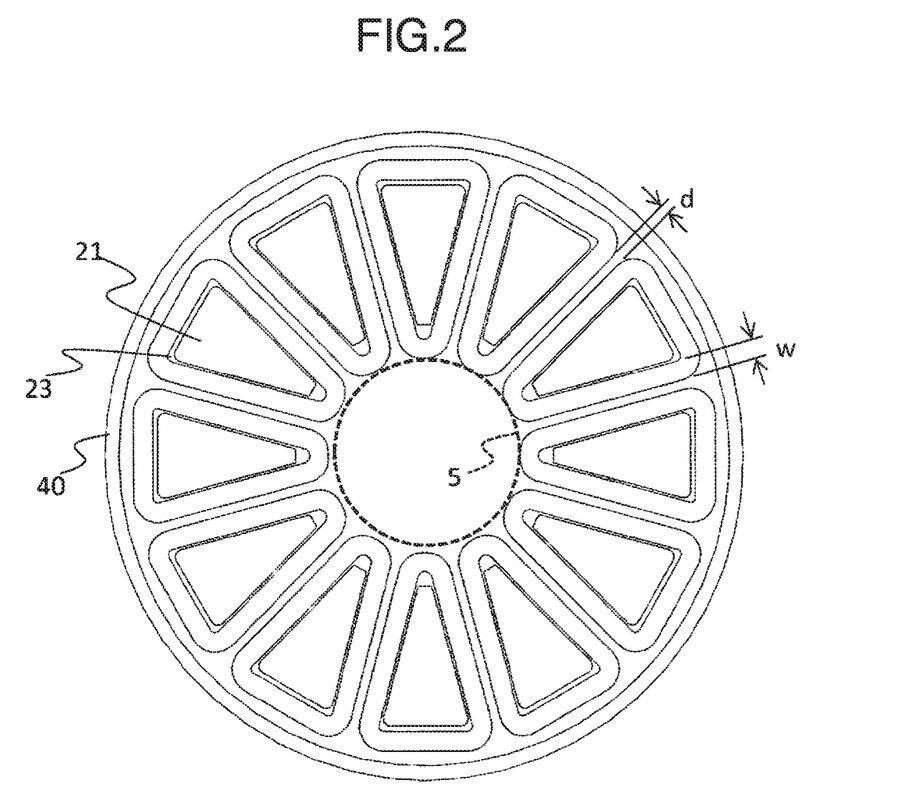
FIG. 2 is a figure illustrating a stator according to the first embodiment when it is observed from a rotation axis direction.

FIG. 2 illustrates the stator 19 when it is observed from the rotation axis direction. The stator 19 includes 12 core members 20 disposed in an annular shape along an inner periphery of the housing 40 around the rotation axis. The core members 20 adjacent to each other are disposed with a regular interval with a gap (d) determined by a distance between the iron cores 21 and a width (W) of the flange portion 23b of the width and bobbin 23.

The core members 20 are integrally formed with each other with resin mold, and the core members 20 and the inner periphery of the housing 40 are integrally formed with each other with resin mold, and, at the same time, the stator 19 can be fixed to the housing 40. The core members 20 are configured such that resin is filled between adjacent core members 20, between the core member 20 and the inner periphery of the housing 40, between the core member 20 and the mold die 5 at the rotation axis side, and the surface portion except the end surface of the iron core 21 of the core member 20. It should be noted that the end surface of the iron core 21 may be molded with resin. The first embodiment is an example in which the stator 19 and the housing 40 are molded with simultaneously, but the molding of the stator 19 may be performed separately, and it may be configured to be fixed to the housing 40 with bolts and the like. Alternatively, a configuration for not applying resin mold may also be employed.

Figure 3:
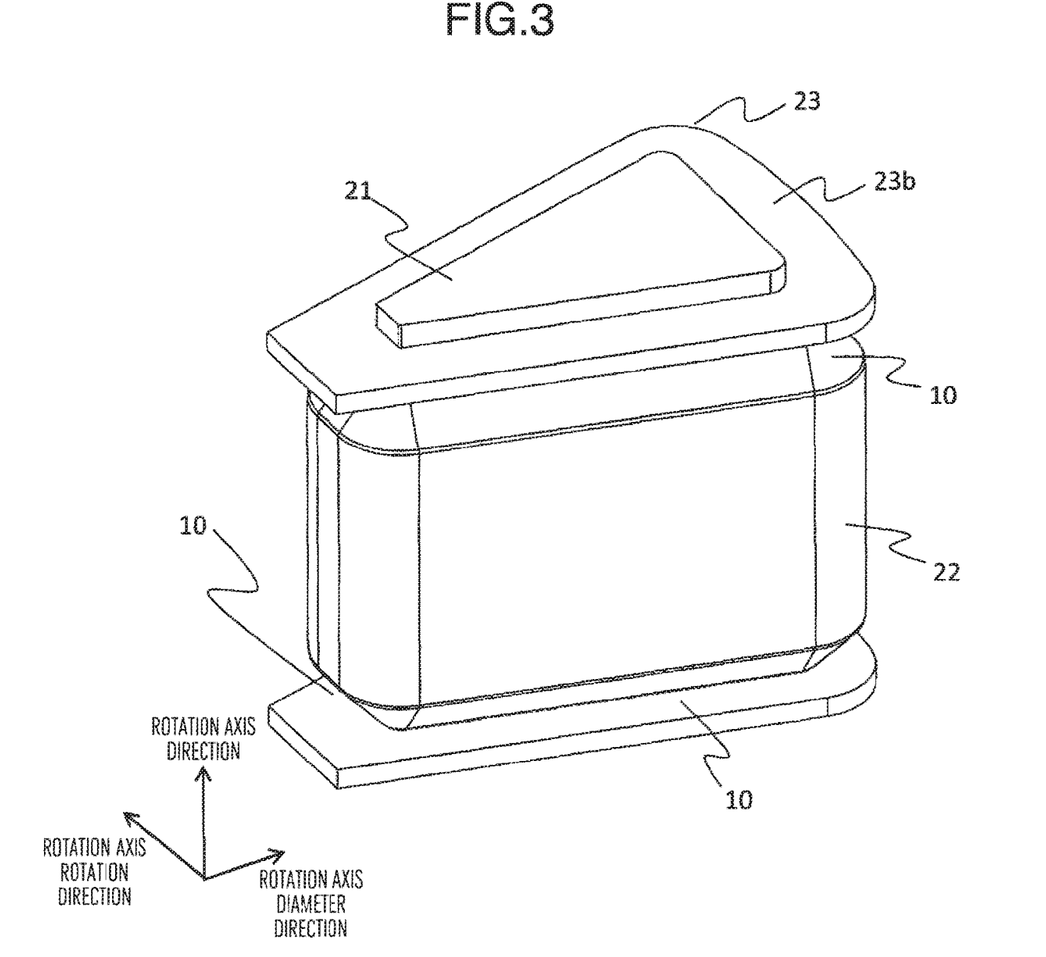
FIG. 3 is a perspective view illustrating a configuration of a core member for a single slot according to the first embodiment.

FIG. 3 illustrates an external perspective view of a core member 20 for a single slot. The core member 20 includes an iron core 21, a coil 22, and a bobbin 23. The iron core 21 has a pillar body shape having a cross section in a substantially trapezoid shape. The iron core 21 is a laminated iron core obtained by laminating thin plate members having magnetic material so that plate pieces have a width that becomes appropriately larger from the rotation axial center to the inner periphery of the housing 40. Amorphous is used as the magnetic material, but the embodiment is not limited thereto. The substantially trapezoid shape of the iron core 21 includes a fan shape and shapes similar thereto. The iron core 21 may be a shape other than a pillar body (a cross section in a rotation axis direction is I, H, T character shapes and the like). Further, the iron core 21 may be a dust iron core and a machined iron core.

The bobbin 23 is an insulating member such as resin, and includes a tube portion 23a having an internal diameter that substantially matches an external diameter of the iron core 21 and flange portions 23b extending a predetermined length over the entire periphery from around both opening end portions of the tube portion 23a in a direction perpendicular thereto. The predetermined length does not need to be uniform over the entire area of the flange portion, and can be changed as necessary in accordance with the specification. In the first embodiment, portions located at the right and left in the rotation axis rotation direction (portions facing diagonal sides of a trapezoid) and portions located at the inner periphery side of the housing 40 (a portion facing the lower bottom of the trapezoid) are slightly longer than the film thickness of the coil 22 that has been wound, thus providing an insulation from the inner periphery surface of the housing 40 and the coil 22 of an adjacent core member. A portion extending in the rotation axial center is slightly longer than this. The flange portion 22 may be configured to be less than a coil lamination thickness.

The coil 22 is wound on the outer periphery side surfaces of the tube portion 23a and between the both flange portions 23b. The coil 22 is wound with a high winding wire tension and with a high space factor. In the first embodiment, a round wire is applied as the coil 22, but even in a case where a square line is used while a diagonal line of the square line is perpendicular to the drawing direction of the iron core 21, the present invention can be applied.

The coil 22 is started to be wound from an attachment portion of the surface at the side of the tube portion 23a of the flange portion 23b, and the coil 22 is wound and turned with regular winding. The coil 22 is wound so that, as the coil 22 is wound at an external side, the number of turns per layer is reduced by one turn, so that the first areas 10 are formed at the side of the both flange portions 23b.

Figure 4:
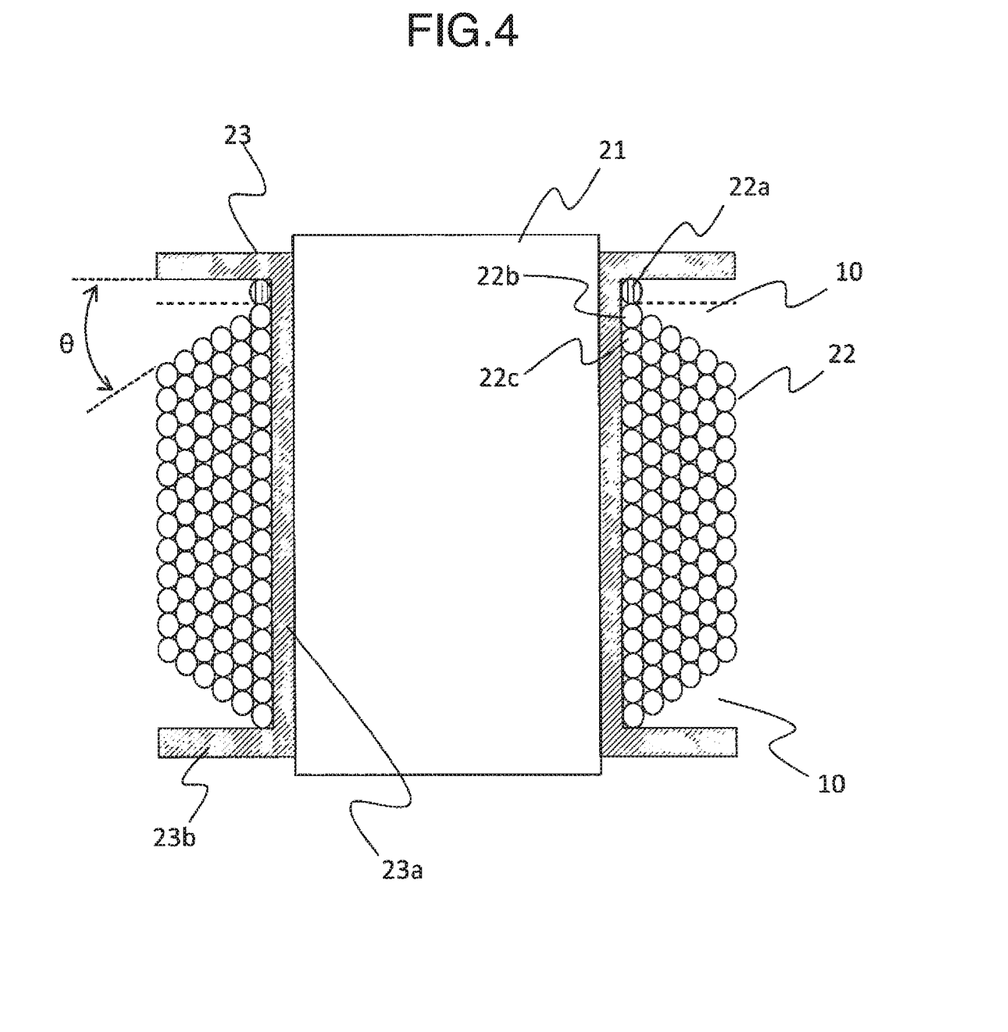
FIG. 4 is a cross sectional view of the core member as illustrated in FIG. 3.

FIG. 4 illustrates a cross sectional view of a core member 20 around which a coil 22 is wound. First, the coil 22 in the first layer is started to be wound from the attachment portion of the flange portion 23 (at the upper portion in the drawing) (22a), and thereafter, the coil 22 is wound to the attachment portion of the other flange portion 23b. The second layer is folded back to be wound so that it is disposed, as much as possible, between the coils 22 in the first layer.

The coil 22 in the second layer wound back to the side of the flange portion 23 (at the upper portion in the drawing) is folded back to be wound for the third layer, so that it is last wound between a coil 22c and a coil 22b wound around in a turn subsequent to a coil 22a at the start of winding of the first layer. Thereafter, the fourth layer, the fifth layer, and the sixth layer are wound in such a manner that the number of turns is one turn less than the number of turns of an adjacent layer. As a result, as illustrated in FIG. 4, the coil 22 forms a multi-stage winding making an angle θ with the flange portion 23b.

The coil 22 wound as described above generates a formation pressure in the direction of the bobbin 23.

Figure 5A:
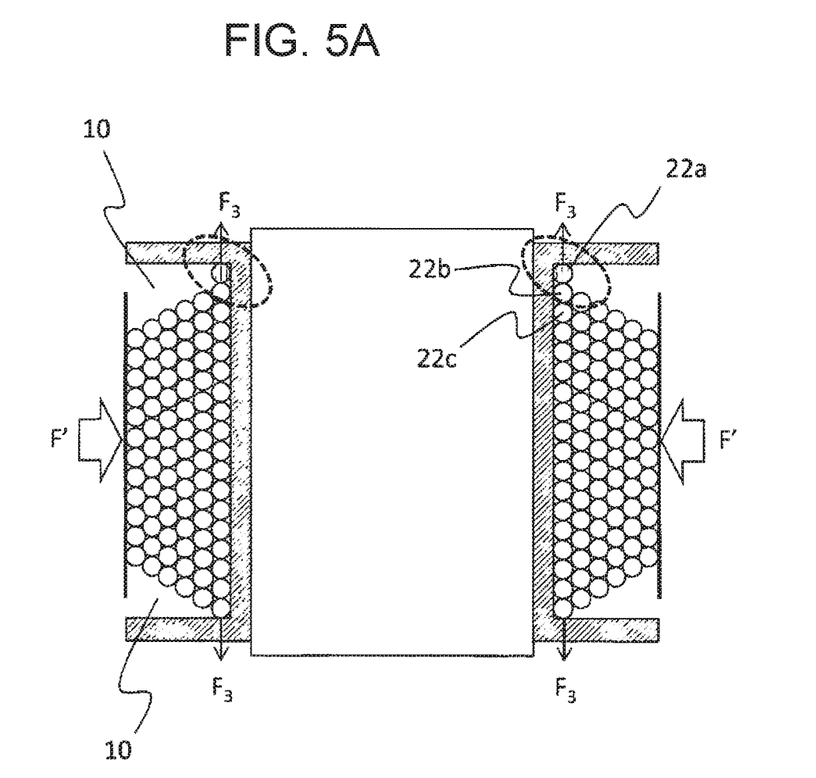
FIG. 5A is a cross sectional view schematically illustrating a coil pressurizing force of the core member as illustrated in FIG. 3.
Figure 5B:
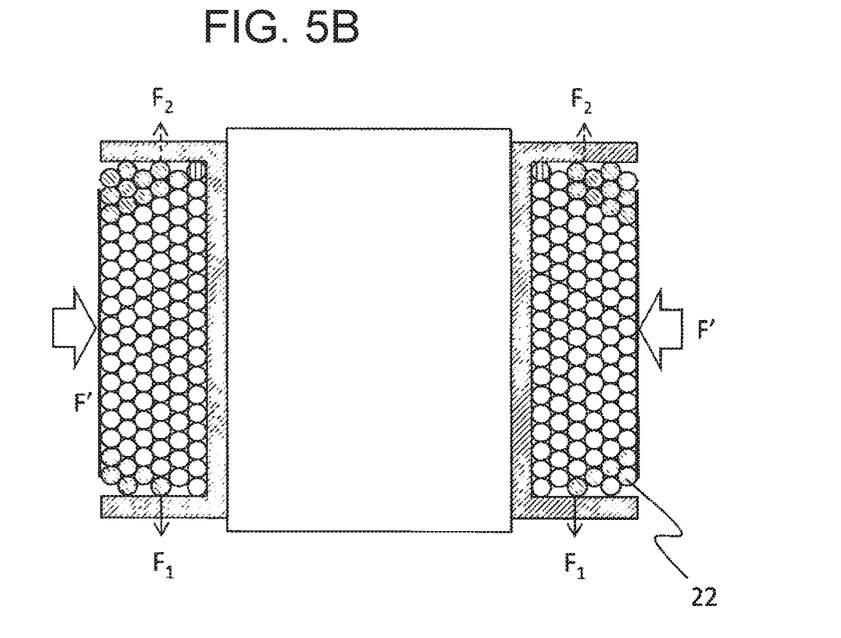
FIG. 5B is a cross sectional view schematically illustrating a coil pressurizing force of a core member serving as a comparative example.

FIG. 5(a) schematically illustrates a pressurization relationship after the winding according to the first embodiment. FIG. 5(b) illustrates a comparative example. As illustrated in FIG. 5(a), the coil 22 generates a force of F' in the direction of the bobbin 23 from the external side. F' is divided into a force orthogonal to the tube portion 22a and a force F3 in the drawing direction of the tube portion 22a. F3 pressurizes the attachment portion of the flange portion 23b via the coil 22a in the first layer and 22x.

In contrast, in the comparative example of FIG. 5(b), the coil is configured to be wound on the entire winding area between the both flange portions 23b. In this example, the coils in the first, third, and fifth layers come into contact with the flange portion 23b, and pressurizes with forces F1, F2.

In general, at the attachment portion side, the flange portion 23b can more strongly resist the stress against the force in the drawing direction of the tube portion 23a such as F1, F2, F3. In the case of the comparative example of FIG. 5(b), the flange portion 23b may be deformed to warp to the rotator side, and may damage the attachment portion, but in the case of the configuration of the present embodiment as illustrated in FIG. 5(a), a force applied to the flange portion 23b during pressurization molding and after formation greatly decreases, and therefore such problem is less likely to occur.

According to the first embodiment, a pressurizing force from the wound coil 22 to the flange portion 23b greatly decrease, so that the motor 1 achieving a smaller size, a higher performance, and a lower cost can be obtained. In particular, the iron core 21 itself does not have means to cope with the pressurizing force from the coil, and therefore, it is likely to be damaged by the pressurizing force from the coil after the flange of the bobbin 23 is molded and after it is formed. In a case of the open slot iron core structure just like the one in the first embodiment, this can be said to be particularly effective.

The first turn at be beginning of winding of the first layer is configured not to be in contact with the coil in the other layer wound after that, so that a space size of the first area 10 can be adjusted. More specifically, When the first area 10 is used as a storage area of wires like the second, third, and fourth embodiments explained later, the number of turns of the coil that do not come into contact with the other layers may be increased or decreased in accordance with the amount of stored wires and the like, so that the size of the storage area can be adjusted.

The first turn and the final turn of the first layer are reliably supported by the both flange portions 23b, and therefore, a collapse of coil 22 can be prevented.

The stator 19 is held with mold resin, and therefore, the first area 10 functions as a flow path of resin. The first area 10 reduces the flow path resistance, and contributes to the improvement of the filling performance.

A distance over which the rotator 30 and the end surface, which faces the rotation axis of the coil 22, face each other increases in an average manner, and therefore, the leakage magnetic flux interlinked with the coil 22 decreases. Therefore, an effect can be expected, in which an eddy current generated in the coil 22 decreases, and the efficiency increases.

Modification of First Embodiment

Figure 6A:
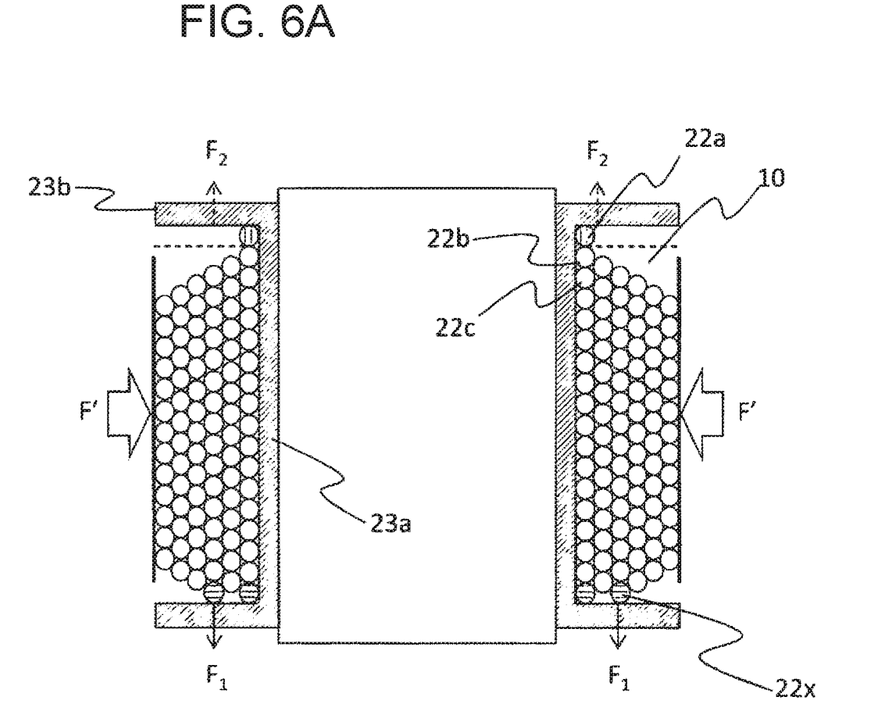
FIG. 6A is a cross sectional view illustrating an arrangement and the like of a coil according to a modification of the first embodiment.
Figure 6B:
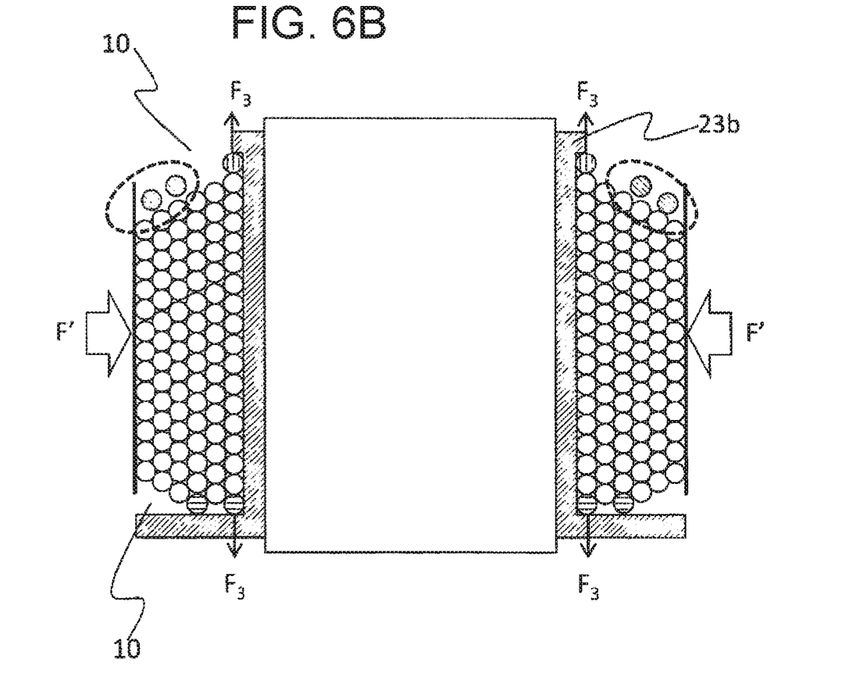
FIG. 6B is a cross section illustrating an arrangement and the like of a coil according to another modification of the first embodiment.

The winding wire method of the coil 22 is not limited to the coil arrangement of the first embodiment, and it can be said that the winding wire method of the coil 22 is applicable as long as the first area 10 is formed. FIGS. 6(a) and 6(b) illustrate cross sectional views of a core member 20 according to a modification.

When an attention is given to a flange portion 23b at a lower side of FIG. 6(a), a coil 22x in the final turn in the third layer comes into contact therewith. In the fourth and subsequent layers, the coil 22 is wound with the number of turns obtained by subtracting a single turn from a layer adjacent to the inside. As already explained above, at a position closer to the attachment portion, the flange portion 23b has a higher stress for resisting the force F1. The present invention is not limited to the winding wire method in which the number of turns of a layer at an external side is always reduced by one turn from the first layer coming into contact with the tube portion 22a where the coil is started to be wound, and as shown in FIG. 6(a), the present invention also includes a case where the third layer coming into contact with the flange portion 23b is "the first layer" as referred to in the first embodiment. What number layer from the innermost-side layer the "first layer" is defined to be in accordance with the balance between the strength of the flange portion 23 and the amount of required winding of the coil 22.

When an attention is given to the flange portion 23b at the upper side in FIG. 6(b), the numbers of turns in the fourth and fifth layers are the same as the number of turns in a layer at the inside thereof (i.e., a number of turns smaller by one turn). Further, the winding position is not between the coils of an adjacent layer at the inside. However, none comes into contact with the flange portion 23b. From the perspective of maintenance of the flange portion 23b for the coil pressurizing force, as long as the coil 22 of a layer at the outside does not come into contact with the flange portion 23b, the number of turns of some of the layers can be said to be the same as or equal to or more than an adjacent layer.

In FIG. 6(b), the length of the flange portion 23b at the upper side of FIG. 6(b) is shorter. The length of the flange portion 23b from the tube portion in a direction perpendicular thereto may be such a length that at least the winding wire in the first layer at the innermost side can be held, and may not be necessarily a length for covering the entire end surface in the axial direction of the coil 22. When the length of the flange portion 23b is reduced, an effect of improving the flowability of the resin can be improved.

Second Embodiment

One of the characteristics of a motor 1 according to the second embodiment is that the first area 10 of the first embodiment is used as an area for storing a connecting line 51 extending from each core member 20.

Figure 7:
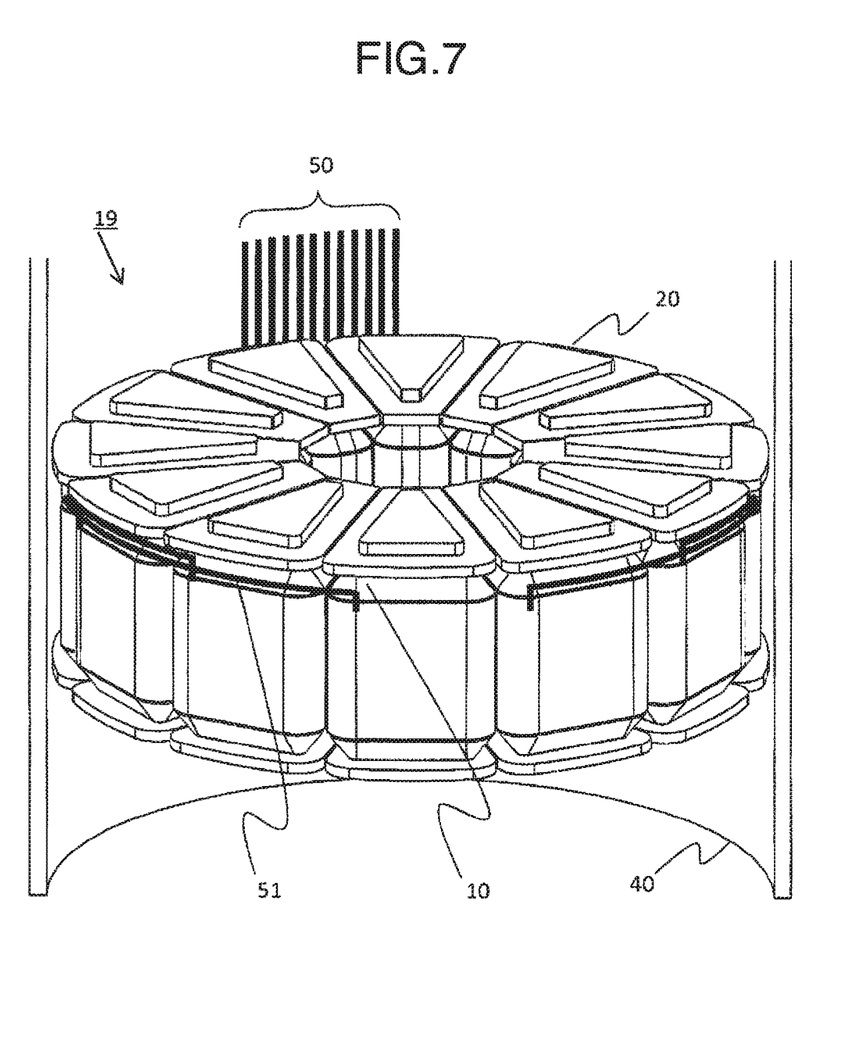
FIG. 7 is a perspective view illustrating an arrangement of a stator and a connecting line according to a second embodiment.

FIG. 7 illustrates a perspective view of a stator 19 of a motor 1. For the sake of simplifying the explanation, resin for molding the stator 19 is omitted. The same portions as those of the first embodiment will be denoted with the same reference numerals, and explanation thereabout is omitted.

The connecting line 51 extending from a core member 20 is arranged in the first area 10 formed at one of the output axial sides. The connecting lines 51 are gathered as a connecting line group 50 toward the core member 20 closest to the terminal box.

In a case where the coil 22 is configured to be wound in the entire area between the flange portions 23b, an arrangement space of the connecting lines is considered to be provided in proximity to the surface of the flange portion 23b at the side of the rotator 30, but there are problems such as a static electricity capacity generated with the rotator 30 and a contact with the rotator 30. Further, there is a problem in that it is necessary to provide a member for holding the connecting line 51 in order to resist the filling pressure during resin molding. The connecting line 51 is considered to be arranged at the further outside of the outermost periphery of the coil 22, but it is necessary to form a clearance from the inner periphery of the housing 40 because of the connecting line 51, and there is a problem of a ratio of performance with respect to the size of the motor 1.

The second embodiment achieves the effects of the first embodiment, and in addition, an effect of solving such problems can be obtained. More specifically, the external diameter of the rotator 30 can be increased while the gap from the inner periphery surface of the housing 40 can be ensured. An overhang configuration in which the external diameter of the permanent magnet 31 is larger than the diameter direction external diameter position of the end surface of the iron core 21 increases the amount of effective magnetic flux of the rotator 30, and contributes to achieving a higher output and a higher efficiency. The distance between the connecting line 51 and the rotator 30 necessarily increases, and therefore, the effect exerted on the axial voltage by the static electricity capacities of them both are so small that they can be disregarded. It is not necessary to provide a holding member for holding the connecting line 51.

The second embodiment showed an example in which only one of the first areas 10 in the rotation axis direction is used to arrange the connecting line 51. Alternatively, the other of the first areas 10 may be used, or any one of them may be used alternately from the core member 20.

Third Embodiment

One of the characteristics of a motor 1 according to the third embodiment is that a first area 10 formed at the inner periphery side of the housing 40 from a rotation axial center direction is used as an arrangement area of wires.

Figure 8:
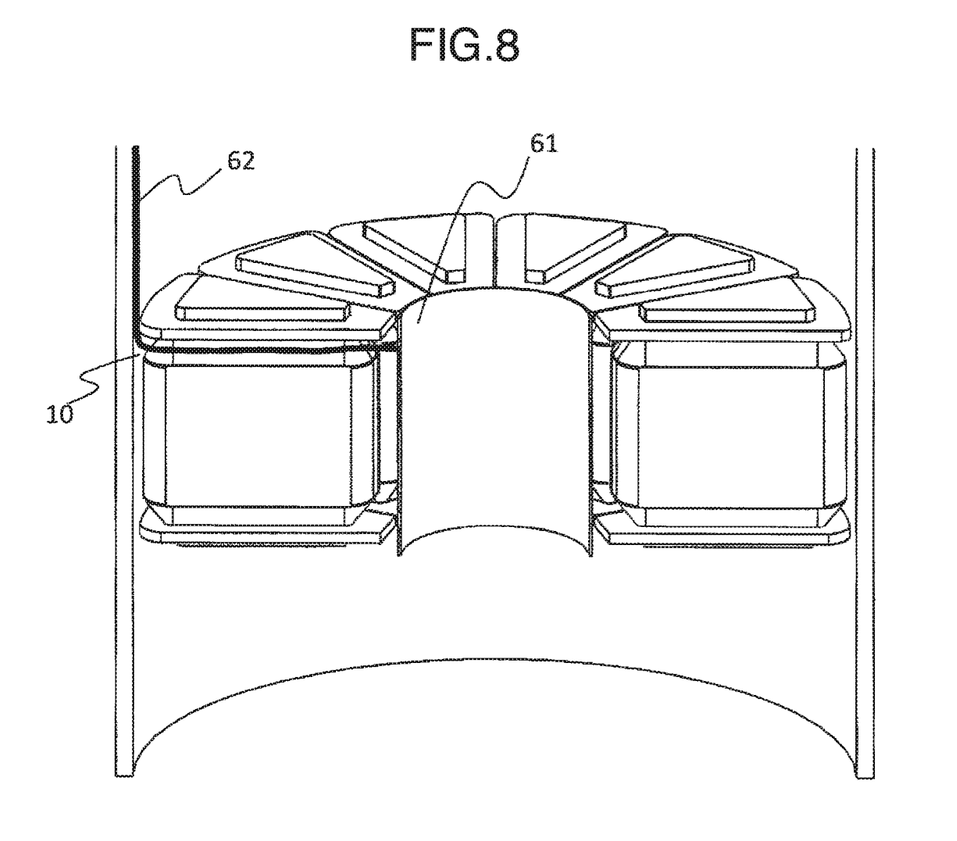
FIG. 8 is a cross section perspective view illustrating an arrangement of a stator, a first conductive member, and a lead wire according to a third embodiment.

FIG. 8 illustrates a cross section perspective view of a stator 19 according to the third embodiment. The same portions as those of the first embodiment will be denoted with the same reference numerals, and explanation thereabout is omitted.

The motor 1 according to the third embodiment includes a cylindrical-shaped first conductive member 61 at the rotation axial center side of the stator 19. The first conductive member 61 is made of a thin plate rolled into a cylindrical shape, so that the rotation axis penetrates to the internal cylinder side. A part of outer periphery surface of the first conductive member 61 is connected to a lead wire 62. The lead wire 62 passes through the first area 10 formed at the inner periphery side of the housing 40 from the rotation axial center, and the other end thereof is electrically connected to the inner periphery of the housing 40. The first conductive member 61 is provided to reduce the static electricity capacity generated between the rotation axis and the coil 22. Such static electricity capacity is a factor to increase the axial voltage.

In a case where the coil 22 is wound on the entire portion between both of the flange portions 23b just as the one in the comparative example as illustrated in FIG. 5(b) explained above, it is difficult to ensure the arrangement space for the lead wire 62, but according to the third embodiment, a connection between the conductive member 61 and the housing 40 can be facilitated. Further, even in a case where the first conductive member 61 and the lead wire 62 are fastened with a bolt and a nut or a swaging component, the first area 10 contributes to providing the space where these components are arranged.

Fourth Embodiment

One of the characteristics of a motor 1 according to the fourth embodiment is that it includes not only the first conductive member 61 but also a second conductive member 63 and a third conductive member 64 on a surface facing a rotator 30 of a flange portion 23b.

Figure 9A:
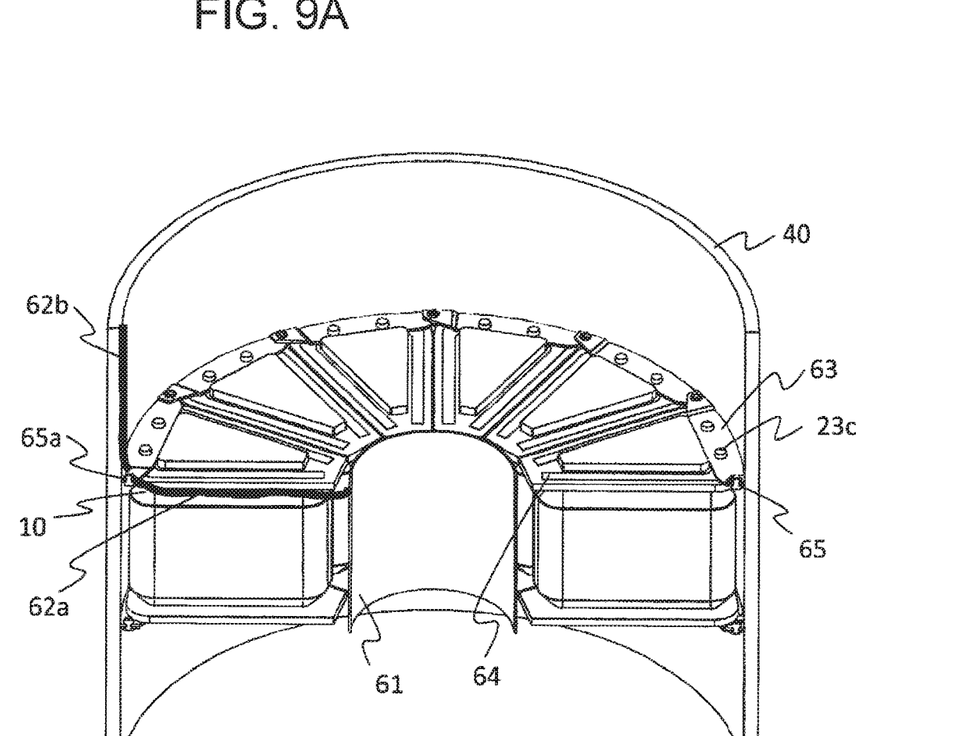
FIG. 9A is a cross section perspective view illustrating an arrangement of a stator, second conductive member and third conductive member according to a fourth embodiment.
Figure 9B:
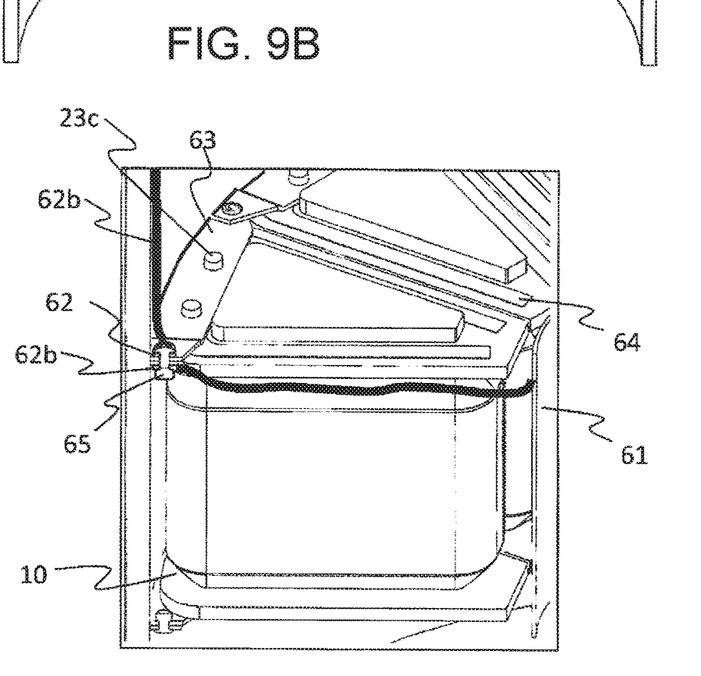
FIG. 9B is a partially enlarged view of FIG. 9A.

FIG. 9(a) illustrates a perspective view of a cross section illustrating the stator 19 according to the fourth embodiment. FIG. 9(b) illustrates a partially enlarged view. The same portions as those of the first to third embodiments will be denoted with the same reference numerals, and explanation thereabout is omitted.

The second conductive member 63 is on the surface of the flange portion 23b facing the rotator 30, and is arranged on a portion sandwiched between the iron core 21 and the housing 40. The second conductive member 63 is made of a plate-shaped metal in which a longitudinal direction is a rotation direction of the rotation axis. The second conductive member 63 is provided with a hole engaging with a projection portion 23c provided in the flange portion 23b, so that it is positioned with the bobbin 23. The second conductive member 63 is mechanically and electrically connected to the lower bottom side outer periphery of the iron core 21 having the end surface in a substantially trapezoid shape and the inner periphery surface of the housing 40.

Further, both end portions of the second conductive member 63 in the longitudinal direction extend to be coupled with the second conductive member 63 of an adjacent core member 20, and a fastening hole 65 provided in the extension portion is fastened with a bolt, a rivet, and the like. The second conductive member includes a function for serving as the earth for the static electricity capacity generated between the rotator 30 and the coil 22, a function for serving as a cooling plate of the iron core 21, a function for shielding the coil 22 and the rotation axis from each other, and a function for positioning the core member 20 with respect to each other.

The third conductive member 64 is on a surface of the flange portion 23b facing the rotator 30, and has a substantially "C" shape extending over portions facing the right and left diagonal side outer peripheries of the iron core 21 and a portion facing the lower bottom side. The third conductive member 64 is made of a thin plate-shaped conductive member (including those in a tape shape), and has a function of electrically shielding the coil 22 and the rotator 30 from each other. The third conductive member 64 is mechanically and electrically connected to the second conductive member 63, and has a function of grounding the static electricity capacity between the coil 22 and the rotator 30. It should be noted that the third conductive member 64 is discontinuous at around the rotation axis, and is configured to prevent an occurrence of an eddy current.

Like the third embodiment, the first conductive member 61 is connected to the lead wire 62a, and is configured to pass through the first area 10 and is arranged in the direction of the first conductive member 61. The other end portion of the lead wire 62a is mechanically and electrically connected to the second conductive member 63. As a result, the first, second, and third conductive members are electrically connected, so that a function of serving as the earth for the static electricity capacity generated between the coil 22 and the rotator 30 is achieved, and a reduction of the axial voltage and bearing electrolytic corrosion are prevented.

According to the fourth embodiment, in order to insulate the coil 22 and the rotator 30 from each other and reduce the static electricity capacity, the second and third conductive members are provided on the surface facing the rotator 30 of the flange portion 23b, and therefore, a margin in terms of space is further more severe than the third embodiment, but the convenience in terms of arranging of various kinds of wires is greatly improved since the first area 10 is provided.

The embodiments for carrying out the present invention have been hereinabove explained, but the present invention is not limited to the above configuration, and various modifications can be made without contradicting the gist of the present invention. For example, in the third and fourth embodiments, the second and third conductive members are made as separate members, but they may be integrally die-cut from a single metal plate, or any one of or both of the conductive members may be configured in such a manner that a paint including a conductive member is applied.

The present invention is not limited to the double rotor-type axial air gap motor, and for example, the present invention can also be applied to a configuration including a single rotor, two or more stators, and three or more rotors. The present invention can also be applied to a synchronous reluctance motor, a switched reluctance motor, an induction motor, and the like. Further, the present invention can also be applied to a generator instead of a motor.

REFERENCE SIGNS LIST

1 . . . double rotor type axial air-gap permanent magnet synchronous motor (motor), 5 . . . mold die, 10 . . . first area, 19 . . . stator, 20 . . . core member, 21 . . . iron core, 22 . . . coil, 22a . . . winding start coil, 22b . . . the second turn coil, 22c . . . the third turn coil, 22x . . . the third layer coil, 23 . . . bobbin, 23a . . . tube portion, 23b . . . flange portion, 23c . . . projection portion, 30 . . . rotator, 31 . . . permanent magnet, 32 . . . yoke, 40 . . . housing, 50 . . . connecting line group, 51 . . . connecting line, 61 . . . first conductive member, 62 . . . lead wire, 62a, 62b . . . lead wire, 63 . . . second conductive member, 64 . . . third conductive member, 65 . . . fastening unit

The invention claimed is:
1. An axial air-gap rotary electric machine comprising
a stator in which a plurality of core members including an iron core made of a substantially pillar body, a coil wound in an outer periphery of the iron core, and a bobbin disposed between the iron core and the coil are arranged in an annular shape along an inner periphery surface of a housing around a rotation axis, and
at least one rotator facing an end surface of the iron core with a predetermined air gap interposed in a rotation axis diameter direction, wherein the bobbin includes:
a tube portion into which the iron core is inserted; and
a flange provided around at least one of both opening end portions of the tube portion and extending a predetermined length in a direction perpendicular to an outer periphery of the tube portion, and
the coil is wound on the outer periphery of the tube portion with regular winding, and
a number of turns of each of plurality of layers wound around an external side of a last layer in contact with the flange is at least one less than a number of turns of each of a plurality of layers wound around an adjacent internal side of the last layer.

2. The axial air-gap rotary electric machine according to claim 1, wherein a coil in a second layer which is subsequent to a first layer wound by being in contact with the flange is wound between the coil wound in a turn subsequent to the coil in contact with the flange in the first layer and the coil wound in a turn still subsequent to the coil, and thereafter, folded back to become a coil in a third layer.

3. The axial air-gap rotary electric machine according to claim 1, wherein the coil comes into contact with the flange at around an attachment portion of the flange and the tube portion.

4. The axial air-gap rotary electric machine according to claim 1, wherein there is the coil wound for at least a single layer at an internal side with respect to a layer wound in contact with a surface of an outer periphery side of the tube portion of the flange.

5. The axial air-gap rotary electric machine according to claim 1, wherein a connecting line extended from each of the plurality of core members is disposed between the flange and a coil end surface facing the flange.

6. The axial air-gap rotary electric machine according to claim 1, wherein the stator further includes a tube-shaped first conductive member in which the rotation axis penetrates through an internal portion,
the axial air-gap rotary electric machine further includes a lead wire in which one of end portions is electrically connected to an outer periphery of the first conductive member, and other of the end portions is electrically connected to the inner periphery surface of the housing, and
the lead wire is disposed between the flange and a coil end surface facing the flange.

7. The axial air-gap rotary electric machine according to claim 6, wherein the bobbin further includes another conductive member provided on a surface of the flange facing the at least one rotator and covering a portion of the surface and electrically connected to the inner periphery surface of the housing, and
the another conductive member is connected to the lead wire.

8. The axial air-gap rotary electric machine according to claim 6, wherein the bobbin is arranged with a second conductive member which is provided on a surface of the flange facing the at least one rotator and in a portion of the inner periphery surface side of the housing and in which a rotation axis rotation direction is a longitudinal direction, and
the second conductive member is electrically connected to the inner periphery surface of the housing and connected to the lead wire.

9. The axial air-gap rotary electric machine according to claim 8, wherein the iron core includes an end surface in a substantially trapezoid shape,
the tube portion and the flange of the bobbin have a cross-sectional shape in the substantially trapezoid shape in accordance with the outer periphery shape of the iron core,
the bobbin is further arranged with a third conductive member on a surface of the flange facing the rotator and at least one rotator and in a portion facing the flange of an adjacent core member in a rotation axis rotation direction and in which a direction from the inner periphery surface of the housing to the rotation axis is a longitudinal direction, and
the third conductive member is electrically connected to the second conductive member.

10. The axial air-gap rotary electric machine according to claim 1, wherein the plurality of core members are integrally molded and formed with resin.

11. The axial air-gap rotary electric machine according to claim 1, wherein the plurality of core members and the inner periphery surface of the housing are integrally molded and formed with each other with resin.

12. An axial air-gap rotary electric machine comprising a stator in which a plurality of core members including an iron core made of a substantially pillar body, a coil wound in an outer periphery of the iron core, and a bobbin disposed between the iron core and the coil are arranged in an annular shape along an inner periphery surface of a housing around a rotation axis, and at least one rotator facing an end surface of the iron core with a predetermined air gap interposed in a rotation axis diameter direction,
wherein the bobbin includes:
a tube portion into which the iron core is inserted; and
a flange provided around at least one of both opening end portions of the tube portion and extending a predetermined length in a direction perpendicular to an outer periphery of the tube portion, and
a number of turns of each of a plurality of layers wound around an external side of a last layer in contact with the flange is at least one less than a number of turns of each of a plurality of layers wound around an adjacent internal side of the last layer.

13. The axial air-gap rotary electric machine according to claim 12, wherein the coil is wound with regular winding.

* * * * *